No. 668,882. Patented Feb. 26, 1901.
J. O'MEARA.
FASTENING FOR WHEELS, &c.
(Application filed May 16, 1900.)
(No Model.)
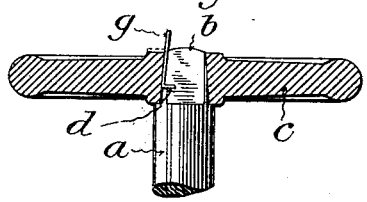
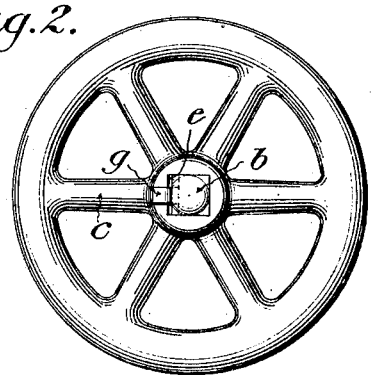
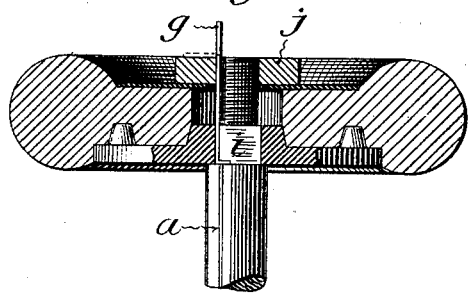
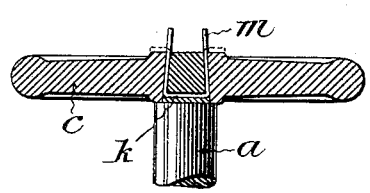
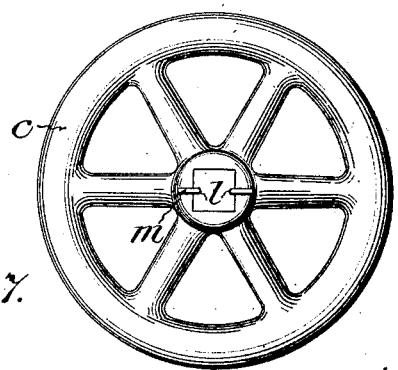
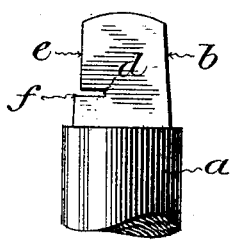
Witnesses:
Inventor:
Jeremiah O'Meara

UNITED STATES PATENT OFFICE.

JEREMIAH O'MEARA, OF NEW YORK, N. Y.

FASTENING FOR WHEELS, &c.

SPECIFICATION forming part of Letters Patent No. 668,882, dated February 26, 1901.

Application filed May 16, 1900. Serial No. 16,888. (No model.)

*To all whom it may concern:*

Be it known that I, JEREMIAH O'MEARA, a citizen of the United States, residing at New York, in the county of New York and State of New York, have invented a certain new and useful Improvement in Fastenings for Wheels and other Objects, of which the following is a full, clear, and exact description.

The object of this invention is to provide a simple, inexpensive, and efficient device for fastening, locking, or fixing wheels to spindles, such as the hand-wheels of valves to the stems of spindles, and whether nuts or other additional fastenings be employed or not.

The invention consists in interposing between the two members or devices or parts to be fastened together a strip of metal or a piece of wire, one end of which is concealed thereby and so engaged therewith as to prevent displacement of the parts in one direction and has its other and outer end bent over upon the outer member to prevent displacement in that direction.

In the accompanying drawings, illustrating my invention, in the several figures of which like parts are similarly designated, Figure 1 is a sectional elevation of a common form of hand-wheel and valve-stem with my fastening applied. Fig. 2 is a plan view of the parts shown in Fig. 1. Fig. 3 is an elevation and plan of another form of valve-spindle. Fig. 4 is a sectional elevation of another form of valve hand-wheel and spindle. Fig. 5 is a sectional elevation, and Fig. 6 a plan view, of another modification of my invention. Fig. 7 is an elevation of a preferred construction of the squared end of a valve-spindle for the utilization of my fastening.

$a$ may represent an ordinary valve-spindle having the squared end $b$, which is adapted to receive the socket or hub portion of an ordinary hand-wheel $c$. As shown more particularly in Fig. 7, a transverse kerf or groove $d$ is made in one side of the squared portion $b$, and the adjacent side of said squared portion is slabbed off, grooved, or reduced at $e$ above the groove $d$—first, for the purpose of providing a space for the reception of the fastening device, to be described, and, second, to provide a shoulder $f$, upon which said fastening device rests, in order to prevent independent endwise movement of the parts in one direction. As shown more especially in Fig. 2, the whole of one side of the squared portion $b$ of the spindle may be reduced to the extent of the thickness of the fastening device.

The fastening device shown in Figs. 1 to 4 and designated $g$ is a strip of flat metal, such as sheet or plate brass, having one end bent at substantially a right angle and fitted into the kerf or groove $d$, while the remainder extends alongside the reduced face of the squared end and between the squared end and the interior of the hub of the wheel, and when the wheel is driven home on the spindle then the projecting free end of the fastening is bent down over the hub of the wheel, as shown in dotted lines, Fig. 1, and in full lines, Fig. 2. When the parts are assembled as shown, it is obvious that the wheel cannot escape from the spindle and the fastening cannot escape from either, and thus the two are united securely enough for all practical purposes and without the use of nuts, screws, or other fastening devices.

If it be desired to employ a nut for securing a hand-wheel or other object to a stem or other part, then the screw-threaded projection for the nut may be grooved and slabbed off to receive the fastening $g$, as shown at $h$ in Fig. 3, and the squared portion may serve as the shoulder, or, as shown in Fig. 4, the fastening may be applied in a groove or kerf in the squared portion $i$ and pass thence along the squared portion and screw-stem and its end bent down over the nut $j$, and in either case the fastening device $g$ would serve also as a nut-lock.

The modification shown in Figs. 5 and 6 consists in transversely perforating the squared portion of the stem, as at $k$, and providing opposite sides of said squared portion with grooves $l$ and then passing a wire or metal strip $m$ through said perforation and bending its ends up into the grooves $l$ and then when the wheel is applied to the stem bending over the projecting ends of the fastening, as shown in dotted lines, Fig. 5, and in full lines, Fig. 6.

Where the fastening device is used to connect two parts and one of the parts is fitted to a shoulder on the other, so that its motion in the direction of the shoulder is arrested by the shoulder, it is immaterial whether the fastening device itself has an adjacent shoulder so long as said fastening device is securely anchored at its inner end on one of the parts.

I have illustrated my invention in connection with the fastening of the hand-wheels of valves to their spindles; but I wish to be understood as not limiting my invention thereto, since it is obvious that the fastening device is applicable to a great variety of objects and a great variety of forms of objects, and hence in the claims forming part of this specification I mean not to be limited to a wheel and its spindle, but mean by such claims to include any two objects which may be united by my fastening device.

It is preferable to use for the fastening device a metal of sufficient stiffness to remain in the bent state against the ordinary strains of use and yet be capable of being bent back, so as to permit the disconnection of the parts united thereby whenever such disunion is necessary or desirable.

What I claim is—

1. A spindle, having a transverse kerf or groove, and a wheel applied to said spindle, combined with a fastening device, having one end rigidly engaged with said kerf or groove and held therein against endwise movement, and passing thence through the wheel and having its outer end bent down upon the outside of the wheel, substantially as described.

2. A spindle, having a transverse groove or kerf, a shoulder next adjacent to said groove or kerf, and a wheel applied to said spindle, in combination with a metallic fastening device anchored in said groove or kerf above the shoulder, and passing thence through the wheel and bent over upon the wheel on the outside thereof, substantially as described.

In testimony whereof I have hereunto set my hand this 14th day of May, A. D. 1900.

JEREMIAH O'MEARA.

Witnesses:
W. L. REDMOND,
J. H. CURRY.